United States Patent [19]

Camara et al.

[11] Patent Number: 5,306,575
[45] Date of Patent: Apr. 26, 1994

[54] POWER GENERATION SYSTEM USING MOLTEN CARBONATE TYPE FUEL CELL

[76] Inventors: Elias H. Camara, 246 Middaugh Rd., Clarendon Hills, Ill. 60514; Kenzo Nakazawa, No. 8-15, Azumznodai, Seya-ku, Yokohama, Japan

[21] Appl. No.: 913,997

[22] Filed: Jul. 17, 1992

Related U.S. Application Data

[63] Continuation of Ser. No. 675,190, Mar. 28, 1991, abandoned.

[30] Foreign Application Priority Data

May 1, 1990 [JP] Japan .................................. 2-115615

[51] Int. Cl.$^5$ ............................................. H01M 8/14
[52] U.S. Cl. .......................................... 429/16; 429/17
[58] Field of Search ................................ 429/16, 17, 26

[56] References Cited

U.S. PATENT DOCUMENTS

| | | | |
|---|---|---|---|
| 4,080,487 | 3/1978 | Reiser | 429/26 |
| 4,128,700 | 5/1978 | Sederquist | 429/17 |
| 4,722,873 | 2/1988 | Matsumura | 429/16 X |
| 4,766,044 | 8/1988 | Sederquist | 429/17 X |
| 5,134,043 | 7/1992 | Nakazawa | 429/16 |

FOREIGN PATENT DOCUMENTS 0400701 5/1990 European Pat. Off. .

OTHER PUBLICATIONS

Patent Abstracts of Japan, vol. 12, No. 162 (E-609) (3009) May 17, 1988 & JP-A-62 274 560 (Mitsubishi Electric Corp.) Nov. 28, 1987.

*Primary Examiner*—Stephen Kalafut
*Attorney, Agent, or Firm*—Peter J. Georges

[57] ABSTRACT

A fuel cell power plant and a process for operating a series of molten carbonate fuel cells in the fuel cell power plant are described. In the fuel cell power plant, cathode feed gas at required cathode feed temperature is introduced into the cathode inlet of the first fuel cell of the fuel cell series. The cathode exhaust gas from the first fuel cell and the cathode exhaust gas from the exhaust outlet of each successive fuel cell is introduced to the cathode inlet of the next fuel cell downstream thereof. The cathode feed temperature to the inlet of each fuel cell after the first fuel cell is maintained at the desired level by adding a reactant-containing gas to the cathode side exhaust between each pair of consecutive fuel cells in the series. The added reactant-containing gas is at a lower temperature than the cathode side exhaust to which it is added, whereby desired cathode feed temperature to the inlet of each successive fuel cell downstream of the first fuel cell is achieved.

2 Claims, 5 Drawing Sheets

POWER GENERATION SYSTEM USING MOLTEN CARBONATE TYPE FUEL CELL

This application is a continuation of application Ser. No. 07/675,190, filed Mar. 28, 1991, now abandoned.

BACKGROUND OF THE INVENTION

1. Technical Field

The present invention relates to a power generation system using molten carbonate type fuel cells.

2. Background Art

A fuel cell directly transforms chemical energy of fuel into electrical energy and there are proposed a lot of power generation systems using fuel cells. A conventional molten carbonate type fuel cell system will be explained with reference to FIG. 7 of the accompanying drawings. A fuel cell 1 includes a stack of fuel cell elements with separators being interposed between two adjacent fuel cell elements. The fuel cell element is generally composed of an anode, a cathode, an electrolyte sandwiched by the anode and the cathode. Anode gas passages and cathod gas passages are formed in the separators. Air A is compressed by a compressor 4, then cooled by a cooling device 5, compressed by another compressor 6, preheated by an air preheater 7 and led into a cathode chamber 2 of the fuel cell 1 through a line 8. This is an oxidizing gas introduction to the cathode chamber 2. A part of the air A flowing through the line 8 is branched to a reformer 10 by a line 9. Gases discharged from the cathode chamber 2 are led into a turbine 12 through a line 11 and then introduced into the air preheater 7 before expelled. Part of the gases discharged from the cathode chamber 2 is fed back to an cathode chamber entrance side by a recycle line 25 and a recycle blower 26.

Gases discharged from the anode chamber 3 of the fuel cell 1 contain moisture. Thus, the moisture is usually separated from the gases before used agaiing in the cycle. For this purpose, the anode gas discharged from the anode chamber 3 of the fuel cell 1 is forced to flow through a heat exchanger 13, preheaters 14 and 15, an evaporator 16, a condenser 17 and a gas-liquid separator 18. The anode gas is cooled in the heat exchanger 13 and is subjected to a heat exchange with natural gas NG in the preheaters 14 and 15. The anode gas is condensed in the condeser 17 and the moisture and gases are separated from each other by the gas-liquid separator 18. The gases separated are introduced into the reformer 10 by the blower 19 through a line 20 extending to the heat exchanger 13. Water ($H_2O$) is pressurized by a pump 21 and sent to a water heater 22. The water is heated to steam by the heater 22 and led to the reformer 10 via a line 23 and the evaporator 16. The water is mixed with the natural gas NG in the reformer 10. Fuel produced in the reformer 10 is introduced to the anode chamber 3 of the fuel cell 1 through a line 24 whereas gases discharged from the reformer 10, which gases containing carbone dioxide, are introduced to the cathode chamber 2 of the fuel cell 1 with gases flowing in the line 8.

Heat is produced in the fuel cell 1 as the fuel cell power generation system is operated. Thus, in order to cool the fuel cell 1, a ratio of gases introduced to the anode chamber 3 and the cathode chamber 2 is adjusted to about 1:10. In other words, an amount of gases to be introduced to the cathode chamber 2 becomes larger than that of gases introduced to the anode chamber 3 so that the cathode is cooled by a large amount of air. A temperature difference between the entrance and the exit of the cathode chamber 2 is generally 100° to 150° C. This is a small difference. Therefore, a large amount of air is necessary for cooling, namely air of five to ten times necessary for reaction is required.

FIG. 8 shows a fundamental construction where air is used for cooling the cathode. The line 8 which supplies the cathode gas to the cathode chamber 2 is provided with the air preheater 7 and the cathode exhaust gas is fed to the air preheater 7 by the line 11.

Following passages deals with a case where the entrance temperature of the cathode chamber 2 is 600° C., the exit temperature of the cathode chamber 2 is 700° C. and the difference therebetween is 100° C.

Meanwhile, in a case where a large amount of air is required for cooling the cathode, the system employing the air preheater 7 like the one illustrated in FIG. 8 has following disadvantages:

(1) The air preheater 7 has to be large in size. Accordingly, a profitability of a power generation plant is deteriorated in terms of cost and volume and the piping and the blower become large;

(2) High temperature exhaust gases of the fuel cell cannot be used. Specifically, a high temperature portion of the gases discharged from the cathode chamber 2 is used for preheating the gases to be fed to the cathode chamber 2 in the air preheater 7. Therefore, it is not possible to effectively use the hot exhaust gas discharged from the cathode chamber 2; and (3) A partial pressure of $CO_2$ drops as an amount of air increases. Therefore, a large voltage (potential difference) cannot be expected.

On the other hand, a construction of FIG. 9 is also proposed. In FIG. 9, with comparison to FIG. 8, the air preheater 7 is not used. Instead, a part of the cathode gas discharged from the cathode chamber 2 is recycled to the entrance of the cathode chamber 2 by the recirculation line 25 and the recirculation blower 26. The high temperature gases discharged from the cathode chamber 2 is mixed with air introduced to the cathode chamber 2, thereby adjusting the temperature. In this case, the energy consumption of the recycle blower 26 becomes large a problem of safety arises as an amount of cooling air increases.

As described above using a large amount of air in cooling the cathode raises a lot of problems.

SUMMARY OF THE INVENTION

An object of the present invention is to provide a power generation system using fuel cells, which can remarkably reduce an amount of air to be fed to the cathode chamber and a method therfor.

Another object of the present invention is to provide a power generation system using molten carbonate type fuel cells, which can recover the cathode exhaust as with its high temperature being maintained and a method therefor.

A method of supplying a cathode gas to a cathode chamber of a molten carbonate type fuel cell according to one aspect of the present invention comprises the steps of: providing a plurality of fuel cells in series; supplying the cathode gas into a cathode chamber of a most upstream fuel cell; leading exhaust gas discharged from an exit of a cathode chamber of the most upstream fuel cell to cathode chambers of the fuel cells provided downstream of the most upstream fuel cell; and utilizing heat of an exhaust gas discharged from one fuel cell to another fuel cell as a heat source to heat cathode gas supplied to an entrance of the most upstream fuel cell. In this method, the cathode gas supplied to the most upstream fuel cell may be heated by gas discharged from a most downstream fuel cell.

According to another aspect of the present invention, there is provided an apparatus for supplying a cathode gas into a cathode chamber of a fuel cell, comprising: a plurality of fuel cells connected to each other in series in a direction the cathode gas flows, each fuel cell having a cathode chamber into which the cathode gas is supplied; an intermediate cathode gas line for connecting each two adjacent cathode chambers to each other; a cathode gas feed line for guiding the cathode gas into the cathode chamber of the most upstream fuel cell; a cathode gas discharge line extending from an exit of the cathode chamber of a most downstream fuel cell; an air preheater connected with the cathode gas discharge line and with the cathode gas feed line for preheating the cathode gas by gas discharged from the cathode chamber of a most downstream fuel cell; and a heat exchanger connected with the cathode gas feed line downstream of the air preheater and with the intermediate cathode gas line for further preheating the cathode gas, which has been preheated by the air preheater, by the cathode gas flowing in the intermediate cathode gas line. A plurality of heat exchangers may be provided and they are connected to each other in series in a manner such that the cathode gas, after passing through the the air preheater, flows through the heat exchangers before reaching the cathode chamber of the most upstream fuel cell.

These and other aspects, objects and advantages of the present invention will be more fully understoo by reference to the following detailed description taken in conjunction with the various figures and appended claims.

DESCRIPTION OF THE PREFERRED EMBODIMENTS

Embodiments of the present invention will be described with reference to the accompanying drawings.

Figure 1:
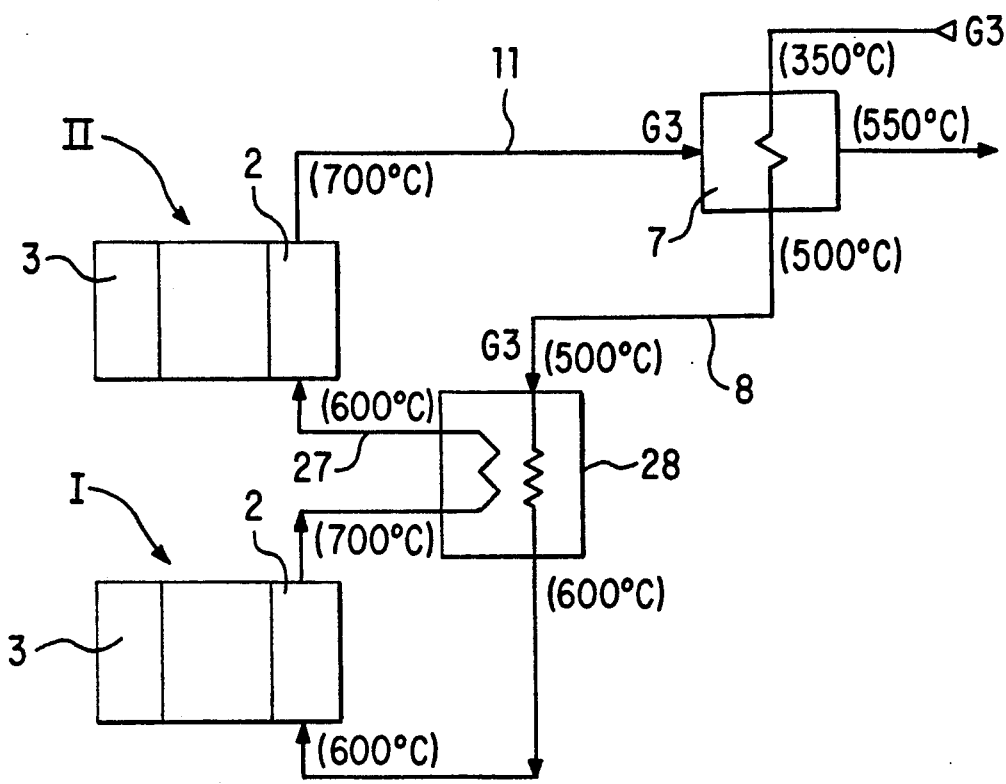
FIG. 1 is a schematic block diagram showing a part of a power generation system using molten carbonate type fuel cells showing one embodiment according to the present invention.
Figure 8:
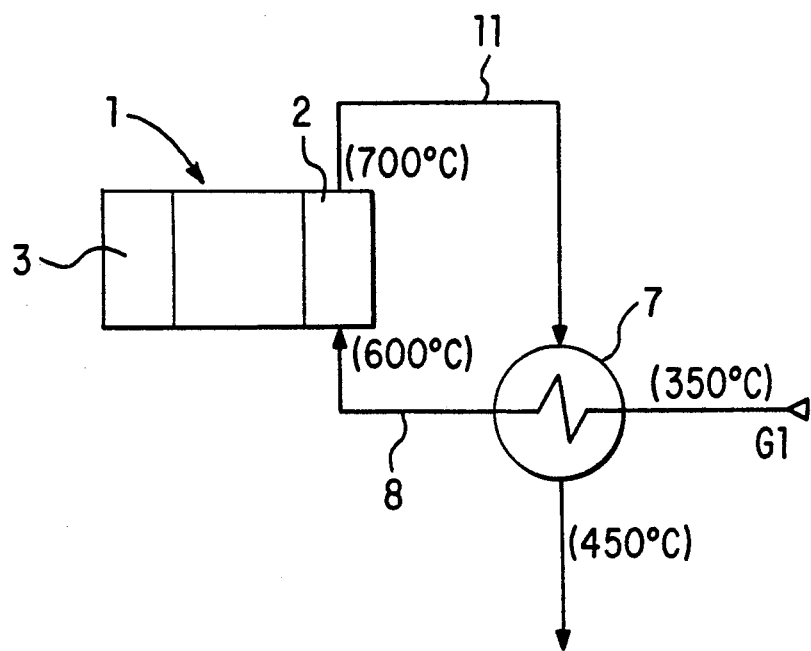
FIG. 8 illustrates a fundamental construction of a conventional power generation system which adjusts a gas temperature at a cathode entrance by an air preheater.

A power generation system of FIG. 1 will be described in comparison with that of FIG. 8. The fuel cell 1 of FIG. 8 is replaced by two fuel cells I and II in FIG. 1. The fuel cells I and II are arranged in series. Specifically, the cathode chambers are communicated with each other in turn in series. Each fuel cell has a half capacity of the fuel cell 1 of FIG. 8. The fuel cells I and II are operated under same conditions. FIG. 1 shows that part of the power generation system which relates to a cooling of a cathode gas. In the following passages, loss due to cell reaction of the cathode gas, loss of a heat exchanger and heat radiation loss are all neglected.

In order to operate the fuel cells I and II under the same conditions, namely to make the cathode entrance temperatures of the fuel cells I and II equal to each other (600° C.) and the cathode exit temperatures of the same equal to each other (700°), there is provided a heat exchanger 28 in a line 27 connecting the cathode chamber exit of the upstream side fuel cell I with the cathode chamber entrance of the downstream side fuel cell II. The line 27 is called intermediate cathode gas line. Gases preheated by an air preheater 7 are introduced to the heat exchanger 28 to cause a heat exchange with the cathode gas flowing from the cathode chamber 2 of the upstream side fuel cell I to the cathode chamber 2 of the downstream side fue cell II. The gases preheated by the air preheater 7 is heated by the gases discharged from the cathode chamber 2 of the downstream side fuel cell II.

Following passages deal with a case using FIG. 8 where numeral G1 is assigned to an amount of gases supplied to the line 8 and the temperature of the gases supplied to the line 8 is 350° C. The gases are preheated by the air preheater 7 and the temperature thereof is raised from 350° C. to 600° C. Then, the gases are introduced to the cathode chamber 2 of the fuel cell I. The gases discharged from the cathode chamber 2, which is called cathode gas, are fed back to the air preheater 7 and the heat exchanging with the lower temperature gases takes place in the air preheater 7. After the heat exchange, the gases are expelled to the atmosphere at a temperature of 450° C. Therefore, the amount of heat exchange at the air preheater 7 is 250G1.

With the above-mentioned idea being applied to a case of FIG. 1, the temperature of the gases to be supplied into the line 8 is 350° C., but since the cathode chamber entrance temperatures of the fuel cells I and II are both 600° C. and the cathode chamber exit temperatures of the fuel cells I and II are both 700° C., which means that the temperature difference across the cathode chambers 2 of the fuel cells I and II are both 100° C., it is necessary to introduce the gases of 500° C. and preheat to 600° C. at the heat exchanger 28 and to preheat from 350° C. to 500° C. at the air preheater 7. The cathode chamber 2 of the upstream fuel cell I and the cathode chamber 2 of the downstream fuel cell II are connected to each other in series so that, in a case where the temperature across the cathode chamber 2 of each fuel cell is set to 100° C., the temperature difference between the cathode chamber entrance of the upstream fuel cell I and the cathode chamber exit of the downstream fuel cell II becomes 200° C. The gas volume or flow rate G3 supplied through the line 8 is proportional to the temperature difference across the cathode chambers 2 of the two fuel cells I and II. Thus, the gas flow rate G3 is reduced to half of a case of FIG. 8. In other words, if 100 is assigned to the gas flow rate G1 suupplied into the line 8 in FIG. 8, the gas flow rate G3 becomes 50. Accordingly, the heat exchange at the heat exchanger 28 is 100G, since the temperature difference is 100° C., and the heat exchange at the air preheater 7 is 150G3. Here, G3=G⅓. Therefore, the heat exchange at the heat exchanger 28, 100G3, is equal to 50G1, and the heat exchange at the air preheater 7, 150G3, is equal to 75G1. The total of these two is 125G1. Thus, the system of FIG. 1 needs only a heat exchange of 125G1 whereas the system of FIG. 8 needs a heat exchange of 250G1, i.e., the former needs only half amount of heat exchange required for the latter.

Figure 2:
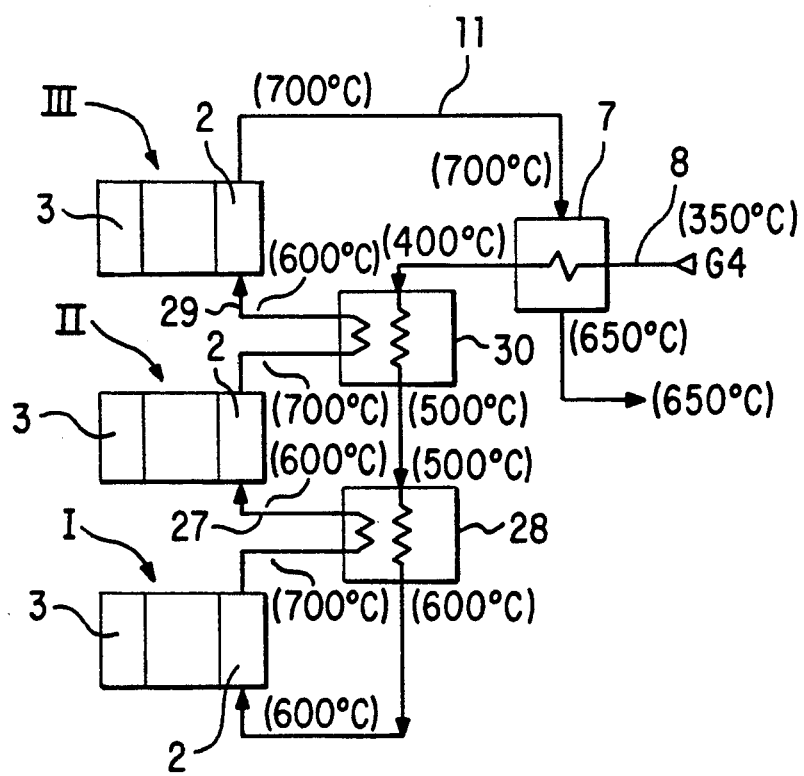
FIG. 2 is another block diagram showing a modification of FIG. 1.

FIG. 2 shows another embodiment of the present invention. Three fuel cells I, II and III are provided and one cathode gas line extends through these fuel cells. A heat exchanger 28 is disposed in the cathode gas line connecting the cathode chamber exit of the upstream fuel cell I with the cathode chamber entrance of the intermediate fuel cell II. Another heat exchanger 30 is provided in the cathode gas line connecting the cathode chamber exit of the intermediate fuel cell II with the cathode chamber entrance of the downstream fuel cell III. Gases introduced into the line 8 and preheated by the air preheater 7 flow through heat exchanger 30 via line 27 and then through heat exchanger 28 via line 29 for the heat exchange such that the fuel cells I, II and III are operated under the same condition with respect to the cathode chamber entrance and exit temperature.

In the system of FIG. 2, when the gas temperature fed into the line 8 is 350° C., the gas is preheated to 400° C. by the air preheater 7, preheated to 500° C. by the heat exchanger 30 and preheated to 600° C. by the heat exchanger 28. The 600° C. preheated gas is then introduced to the entrance of the cathode chamber 2 of the upstream fuel cell I. The cathode gas discharged from the cathode chamber 2 of the fuel cell I is cooled from 700° C. to 600° C. by the heat exchanger 28, the cathode gas discharged from the fuel cell II is cooled from 700° C. to 600° C. by the heat exchanger 30. The temperature difference between the cathode chamber entrance of the upstream fuel cell I and the cathode chamber exit of the downstream fuel cell III becomes 300° C. so that the gas flow rate G4 supplied into the line 8 can be reduced to one third the gas flow rate of the system of FIG. 8. As described above, the fuel cells, each fuel cell exhibiting an output of one third of the total output, are connected to each other in series and intercooled. Thus, the gas flow rate G4 is equal to ⅓G1. Hence, the heat exchange at the respective heat exchangers 28, 30 and 7 are given as follows:

Heat Exchanger 28: 100G4=33G1
Heat Exchanger 30: 100G4=33G1
Air Preheater 7: 50G4=17G1.

The total of the heat exchange of these three is 83G1. This value is one third of the heat exchange of the system of FIG. 8. The system of FIG. 2 has an advantage that the exhaust gas is drawn out of the system at a high temperature (650° C.), in addition to an advangate that the heat exchange is reduced considerably.

Figure 3:
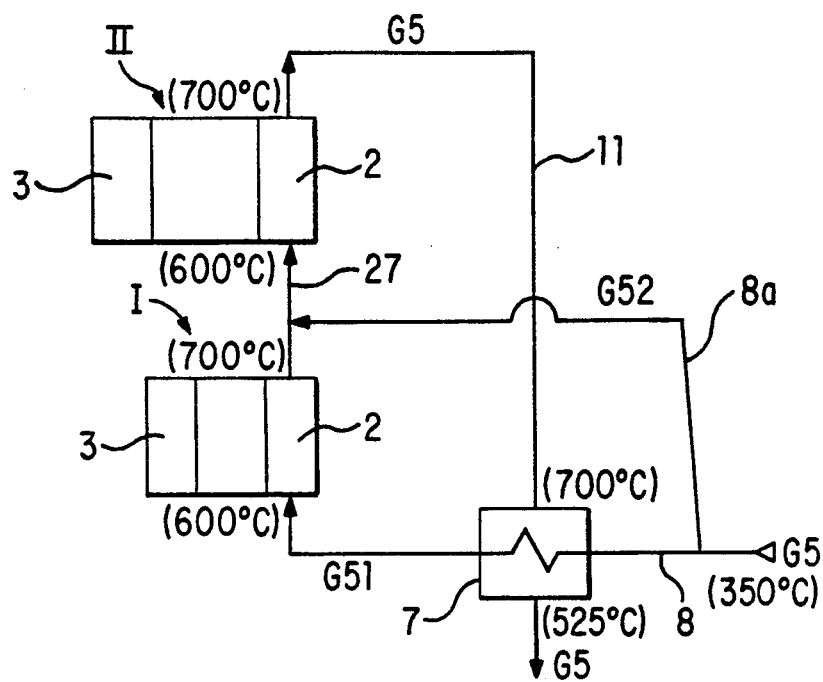
FIG. 3 shows another embodiment of the present invention.

FIG. 3 shows still another embodiment according to the present invention. The system of FIG. 3 does not have the heat exchange 28 as compared with the system of FIG. 1. A gas feed line 8a is branched from the line 8 extending to the air preheater 7 and reaches the intermediate cathode gas line 27 extending between the cathode chamber exit of the upstream fuel cell I and the cathode chamber entrance of the downstream fuel cell II. Thus, the not-preheated low temperature gas is introduced into the line 27 and the temperature of the cathode gas discharged from the cathode chamber 2 of the upstream fuel cell I is lowered.

In FIG. 3, when the temperature of the gas introduced to the line 8 is 350° C., since there is not provided the heat exchanger 28, the gas is heate to 600° C. from 350° C. by the air preheater 7. The cathode gas (700° C.) expelled from the cathode chamber 2 of the upstream fuel cell I is mixed with the gas (350° C.) supplied through the gas feed line 8a in a manner such that the cathode chamber entrance temperature of the downstream fuel cell II becomes 600° C.

The ratio of the gas flow rate G51 of the line 8 to the gas flow rate G52 of the line 8a is given as follows:

$$\frac{G52}{G51} = \frac{700 - 600}{600 - 350} = 0.4$$

Therefore, when 1 is assigned to the gas flow rate G51 of the line 8, the gas flow rate G52 of the gas feed line 8a becomes 04, and therefore the gas flow rate supplied to the cathode chamber 2 of the downstream fuel cell II becomes 1.4, i.e., a sum of 1 (the gas flow rate G51) and 0.4 (the gas flow rate G52).

If the outputs of the fuel cells I and II are proportional to the cathode gas flow rates, following equations are obtained:

$$\text{Fuel Cell I/Fuel Cell II} = 1/1.4$$
$$= 0.42/0.58$$

Thus, in a case of 1 MM plant, the system provides a stack of fuel cells of 420 KW and 580 KW. In FIG. 3, the gas flow rate G5 (the discharging gas flow rate) is a sum of G51 and G52. This means that the G5 is reduced to 0.58G1 (G1 is the gas flow rate of a system of FIG. 8). Since the temperature difference across the air preheater 7 is 250° C. and the gas flow rate G51 introduced into the air preheater 7 is 0.71G5 (G5 is the total gas flow rate), the heat exchange 250G51 is given by a following equation:

$$250G51 = 250 \times 0.71G5 = 250 \times 0.71 \times 0.58G1$$
$$= 103G1.$$

This indicates that the system of FIG. 3 needs smaller heat exchange than the system of FIG. 1. Thus, the air preheater 7 can be designed more compact.

Figure 4:
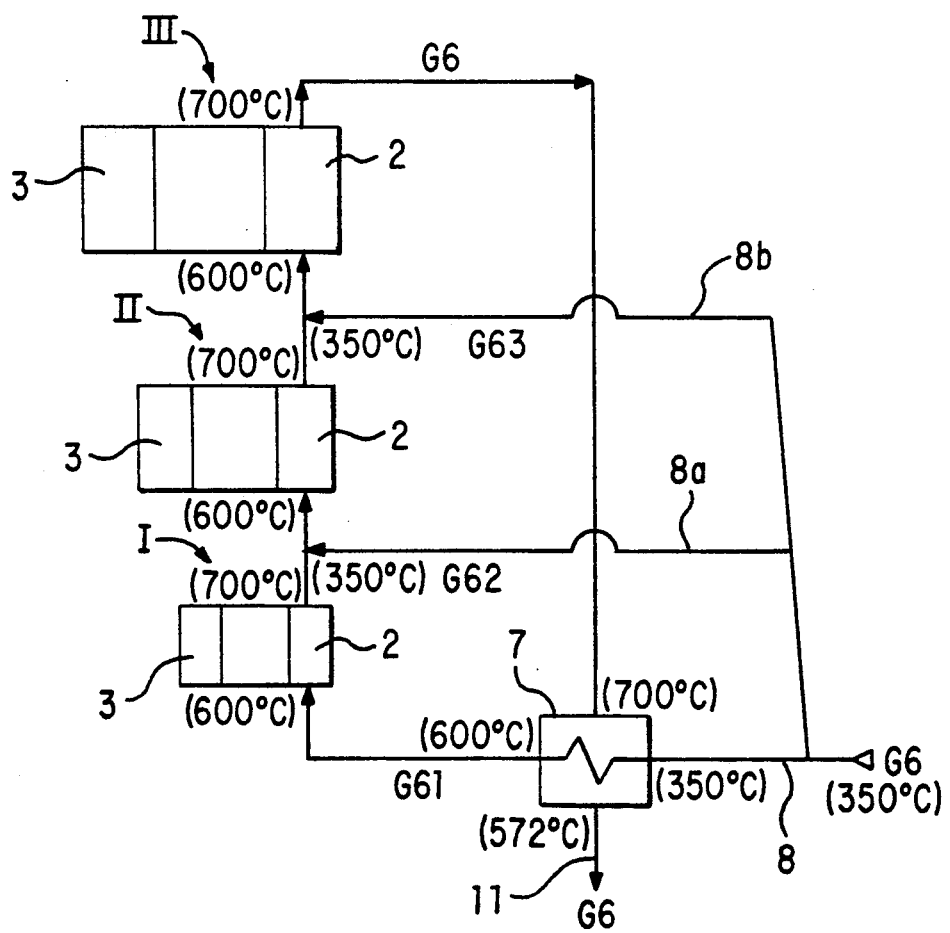
FIG. 4 shows a modified block diagram of FIG. 3.

FIG. 4 also illustrates another embodiment according to the present invention. In comparison with the system of FIG. 2, the system of FIG. 4 does not have the heat exchangers 28 and 30 and there are provided lines 8a and 8b respectively branched from the line 8. The lines 8a extends to the line connecting the upstream fuel cell I with the intermediate fuel cell II and the line 8b extends to the line connecting the intermediate fuel cell II with the downstream fuel cell III.

In FIG. 4, the relatively cool gas is mixed with the cathode gas entering the intermediate and downstream fuel cells II and III to lower the temperature of the cathode gas. As compared with the system of FIG. 2, the total gas flow rate of the system of FIG. 4 is increased due to the gas flowing through the lines 8a and 8b. However, the total gas flow rate of FIG. 4 is still smaller than that of FIG. 8.

In this embodiment, when G61 is assigned to the flow rate of the gas flowing through the air preheater 7 and the cathode chamber 2 of the upstream fuel cell I and G62 is assigned to the flow rate of the gas flowing through the gas feed line 8a, the total gas flow rate (the discharging gas flow rate) G6 is given by a following equation:

$$G6 = G61 + G62 + G63.$$

G62 represents an amount of gas required for lowering the cathode gas temperature from 700° C. to 600° C. and the value thereof is 0.4G61, which is identical to a case of FIG. 3. G63 is given by a following equation:

$$\begin{aligned} G63 &= 0.4(G61 + G62) = 0.4 \times 1.4G61 \\ &= 0.56G61 \end{aligned}$$

Therefore, $G6 = 1 + 0.4 + 0.56 = 1.96G61$.

If the total output of the three fuel cells I, II and II is proportional to the cathode gas flow rate, a following equation is obtained:

$$\begin{aligned} \text{Fuel Cells I/II/III} &= 1/1.4/1.96 \\ &= 0.23/0.32/0.45 \end{aligned}$$

Accordingly, G6 becomes 0.45G1 (G1 is the flow rate of a system of FIG. 8). This means that the gas flow rate required in cooling the cathode is reduced to half in the system of FIG. 4 as compared with the system of FIG. 8. Also, the heat exchange 250G61 at the air preheater 7 is given by a following equation:

$$\begin{aligned} 250G61 &= \frac{250}{1.96} G6 = 128G6 \\ &= 128 \times 0.45G1 \\ &= 57.6G1 \end{aligned}$$

This value is smaller than the value of the system of FIG. 2.

Figure 5:
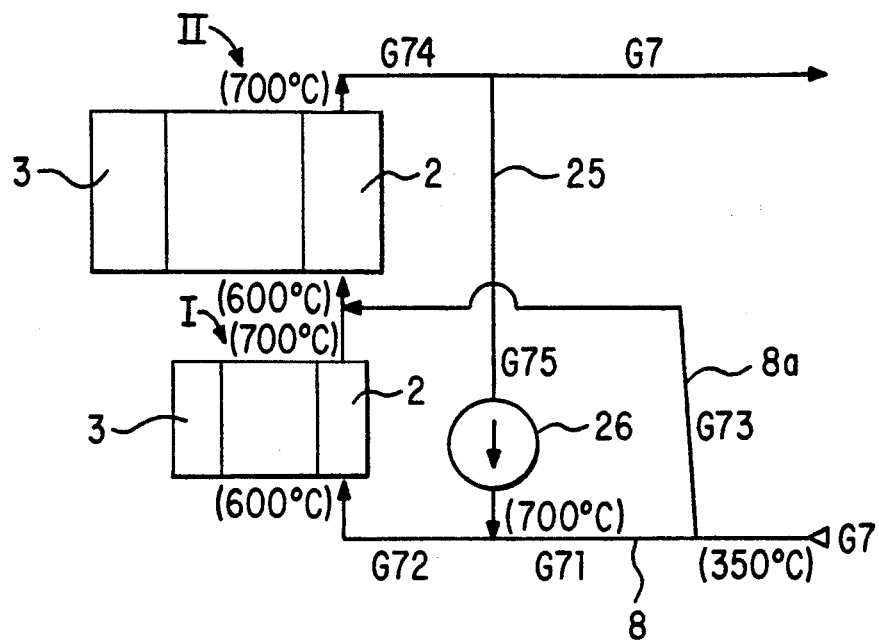
FIG. 5 illustrates still another embodiment according to the present invention.
Figure 6:
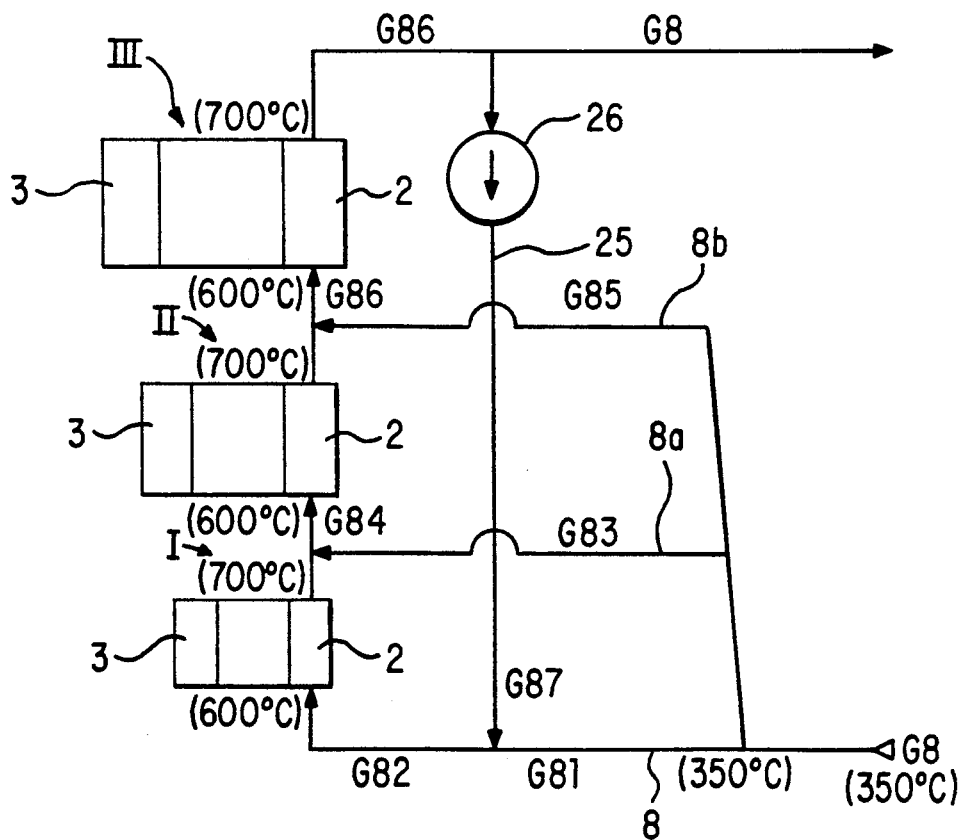
FIG. 6 is a block diagram showing a modification of a system of FIG. 5.
Figure 7:
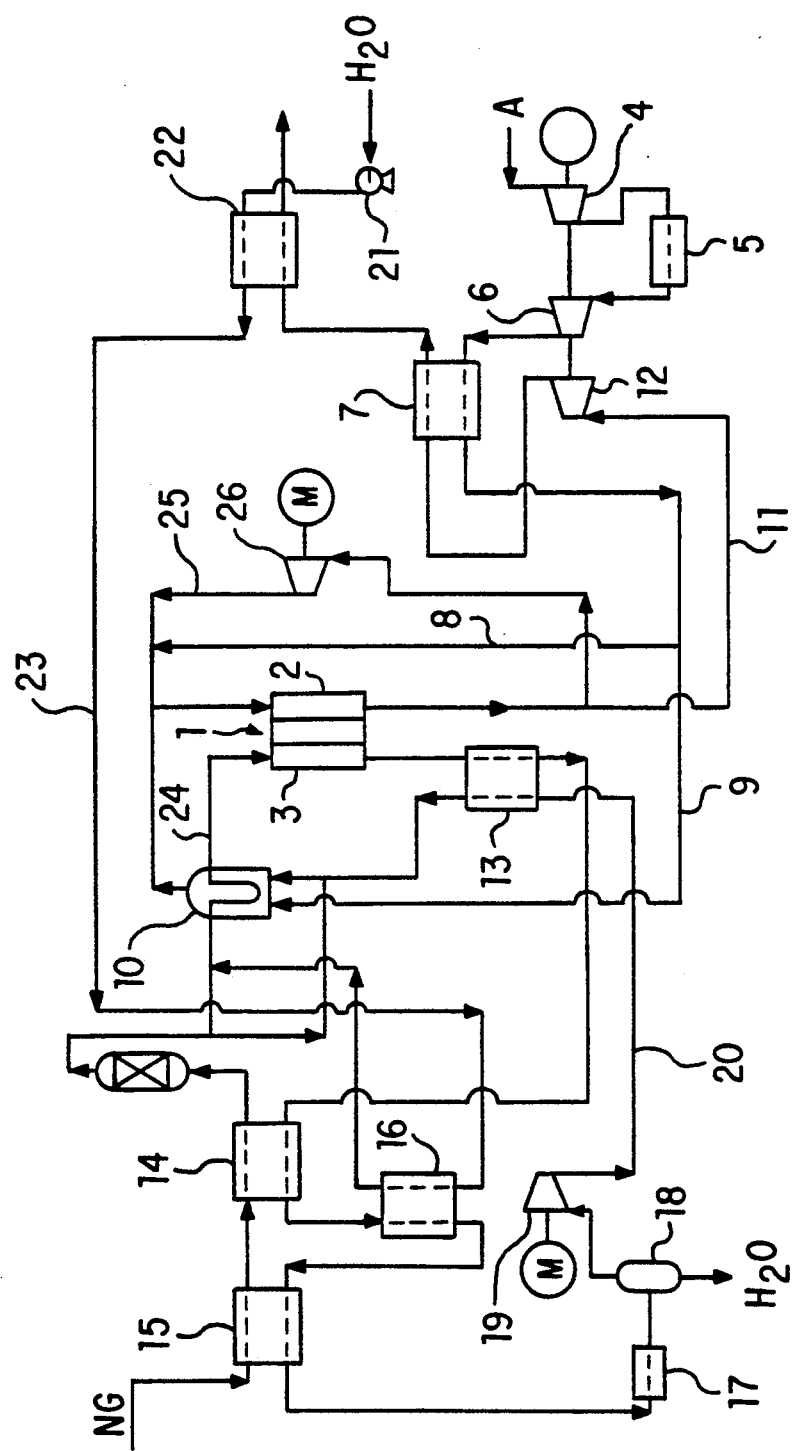
FIG. 7 illustrates a conventional power generation system using molten carbonate type fuel cells.

FIGS. 5 and 6 also depict other embodiments of the present invention. In comparison with the systems of FIGS. 3 and 4, the systems of FIGS. 5 and 6 do not have the air preheater 7. Instead, there are provided a recirculation line in the systems of FIGS. 5 and 25 and a recirculation blower 26 for recirculating part of the high temperature exhaust gas. The recirculated high temperature gas is mixed with the gas supplied into the cathode chamber 2 of the upstream fuel cell I to adjust the gas temperature. The temperature of the gas introduced to the downstream fuel cell is lowered by the low temperature gas directly supplied to the line extending to the downstream fuel cell.

FIG. 5 corresponds to FIG. 3. When the temperature of the gas introduced to the system is set to 350° C., the gas temperature at the cathode chamber entrance of the upstream fuel cell I is adjusted to 600° C. upon introduction of the recirculated gas (700° C.). The recirculated gas is fed to the line 8 by the blower 26. The gas discharged from the cathode chamber 2 of the upstream fuel cell I (700° C.) is adjusted to 600° C. by the 300° C. gas introduced by the line 8a.

When G71 is assigned to the gas flow rate of the line 8, G72 is assigned to the gas flow rate after the introduction of the recirculated gas, G73 is assigned to the gas flow rate of the gas feed line 8a, G74 is assigned to the gas flow rate at the cathode chamber exit of the downstream fuel cell II and G75 is assigned to the gas flow rate of the recirculation line 15, G72 and G74 are respectively given by following equations:

$$\begin{aligned} G72 &= G75 + G71 \\ &= G75 + 0.4G75 = 1.4G75 \\ G74 &= G72 + G73 \\ &= G72 + 0.4G72 \\ &= 1.4G72 \\ &= 1.4 \times 1.4G75 \\ &= 1.96G75 \end{aligned}$$

Therefore, a recirculation coefficient is given by a following equation:

$$\frac{G75}{G74} = \frac{G75}{1.96} \approx 0.5$$

The flow rate G7 of the gas supplied to and discharged from the system is given by a following equation:

$$\begin{aligned} G7 &= G74 - G75 \\ &= G74 - \frac{G74}{1.96} \\ &= 0.5G74. \end{aligned}$$

Figure 9:
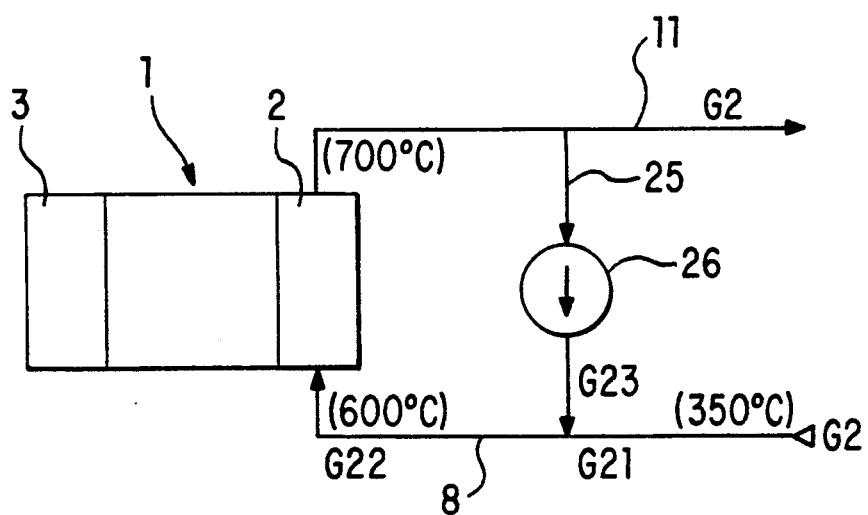
FIG. 9 illustrates a fundamental construction of a conventional power generation system which adjusts the gas temperature at the cathode entrance by means of recirculation.

Referring to FIG. 9 which illustrates a fundamental system of high temperature gas recirculation, when G21 is given to the gas flow rate of the line 8 connected to the cathode chamber 2 of the fuel cell 1, G22 is given to the flow rate of the gases after the introduction of high temperature recirculated gas, G23 is given to the recirculated gas and G2 is given to the flow rate of the gas supplied to the system, following equations are obtained:

$$\begin{aligned} G22 &= G23 + G21 \\ &= G23 + 0.4G23 = 1.4G23 \\ G23 &= G22 - G2 \\ &= 1.4G23 - G2 \approx 2.5G2 \\ G2 &= 0.4G23 = \frac{0.4}{1.4} = 0.29G22 \end{aligned}$$

Accordingly, the recirculation coefficient is given by a following equation:

$$\frac{G23}{G22} = \frac{G23}{1.4G23} = 0.71$$

The comparison of the system of FIG. 5 with the system of FIG. 9 gives a following equation:

$$\begin{aligned} G74 &= 0.58G22 \\ &= 0.58 \times \frac{G2}{0.29} = 2G \end{aligned}$$

G7 is equal to 0.5G74. Thus, $G7 = 0.5 \times 2G2 = G2$. Hence, the amount of gas supplied to and discharged from the system of FIG. 5 is equal to the amount of the system of FIG. 9. The recirculation coefficient is given by a following equation:

$$\frac{G75}{G23} = \frac{G7}{2.5G2} = \frac{G2}{2.5G2} = \frac{1}{2.5} = 0.4$$

This means that the 40% reduction is attained in comparison to the system of FIG. 9.

FIG. 6 corresponds to FIG. 4. When G8 is given to the flow rate of the gas supplied to and discharged from the system, G81 is given to the gas flow rate of the line 8, G82 is given to the gas flow rate after introduction of the recirculated gas, G83 is given to the gas flow rate od the gas feed line 8a, G84 is given to the gas flow rate at the entrance of the intermediate fuel cell II, G85 is given to the gas flow rate of the gas feed line 8b, G86 is given to the gas flow rate at the entrance and the exit of the downstream fuel cell III and G87 is given to the flow rate of the recirculated gas, following relations are obtained:

$$\begin{aligned} G82 &= G87 + G81 \\ &= G87 + 0.4G87 = 1.4G87 \\ G84 &= G82 + G83 \\ &= G82 + 0.4G82 = 1.4G82 = 1.96G87 \\ G86 &= G84 + G85 \\ &= G84 + 0.4G84 = 1.4G84 = 2.7G87 \end{aligned}$$

Accordingly, the recirculation coefficient is given by a following equation:

$$\frac{G87}{G86} = \frac{G87}{2.7G87} = 0.37$$

Here, G87=G8/1.7. Therefore, the comparison with the system of FIG. 9 gives a following equation:

$$\frac{G87}{G23} = \frac{\frac{G8}{1.7}}{\frac{G2}{0.4}} = \frac{0.4}{1.7} \cdot \frac{G8}{G2}$$

G8 is equal to G2.

$$\frac{G87}{G23} = 0.24$$

This means that the 24% reduction is attained in comparison to the system of FIG. 9.

The present invention is not limited to the above-described embodiments. For example, more than three fuel cells may be connected in series.

What is claimed is:

1. In a fuel cell power plant having:
   a. a plurality of fuel cells, each of said fuel cells having an anode side and a cathode side, said anode side including inlet means and outlet means, said cathode side including inlet means and outlet means;
   b. a source of fuel gas in communication with said anode side inlet means of said fuel cells for providing fuel to said fuel cells;
   c. first connecting means connecting said cathode sides in series gas flow relationship;
   d. a source of cathode feed gas;
   e. second connecting means connecting said source of cathode feed gas to said cathode side inlet means of said first fuel cell in the series for providing process cathode feed gas to said first fuel cell and to succeeding fuel cells in the series via said first connecting means;
   f. means constructed and arranged for transferring $CO_2$ produced at said anode sides of all of said plurality of fuel cells to said cathode side inlet means of said first fuel cell in the series for providing $CO_2$ to said first fuel cell and for providing $CO_2$ to succeeding fuel cells in the series via said first connecting means;

the improvement comprising:
   g. reactant-containing gas introduction means associated with said first connecting means between each pair of consecutive fuel cells in the series for adding a reactant-gas to the cathode side exhaust between each pair of consecutive fuel cells, whereby the temperature of the cathode side exhaust between consecutive cells is reduced by dilution with added reactant-containing gas at a temperature less than the temperature of the cathode exhaust to which the reactant-containing gas is added.

2. In a process for operating a fuel cell power plant, including a plurality of molten carbonate fuel cells, each of said fuel cells having an anode side and a cathode side, said anode side including inlet means and outlet means, said cathode side including inlet means and outlet means, said process comprising:
   a. supplying fuel to the anode side of said fuel cells;
   b. providing cathode feed gas at required cathode feed temperature at the cathode inlet of a first of said fuel cells;
   c. introducing cathode exhaust gas from the exhaust outlet of each fuel cell to the cathode inlet of the next fuel cell downstream thereof;
   d. introducing $CO_2$ produced at the anode side of all of said fuel cells into the cathode side of said first of said fuel cells and from said first fuel cell in series through the cathode sides of the remaining fuel cells;

the improved method of providing a desired cathode feed temperature to the inlet of each fuel cell after said first fuel cell which comprises:
   e. adding a reactant-containing gas to the cathode side exhaust between each pair of consecutive fuel cells in the series, said added reactant-containing gas being at a lower temperature than the cathode side exhaust to which it is added, whereby desired cathode feed temperature to the inlet of each fuel cell after said first fuel cell is achieved without removal of heat from the cathode side exhaust between each pair of consecutive fuel cells in the series.

* * * * *